July 15, 1958  W. K. ROOTS  2,843,759
AUTOMATIC ELECTRIC SWITCHING SYSTEM

Filed Sept. 24, 1956  2 Sheets-Sheet 1

Inventor
William K. Roots
by
Stevens Davis Miller Mosher
his attorneys

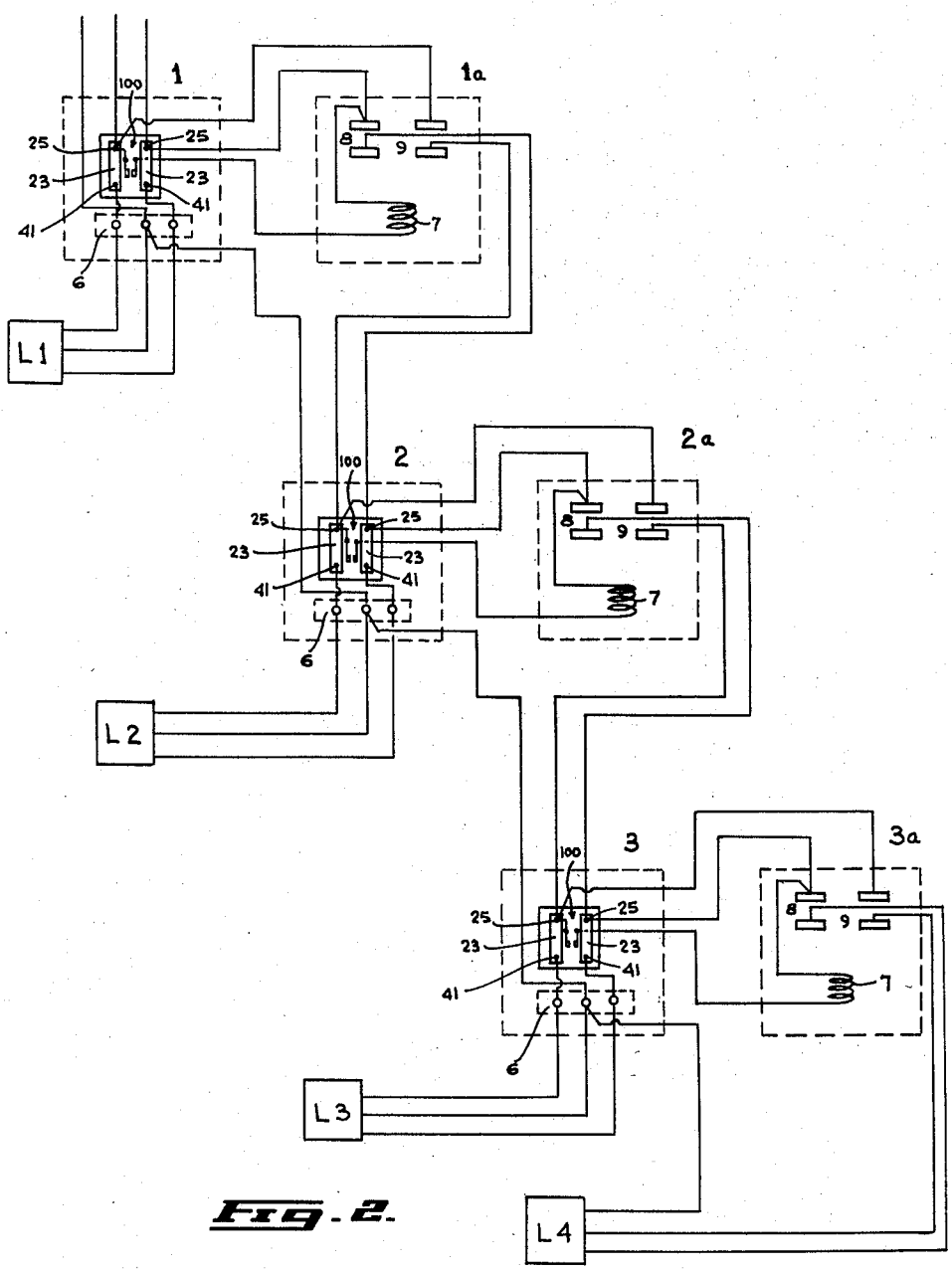

United States Patent Office 2,843,759
Patented July 15, 1958

2,843,759

AUTOMATIC ELECTRIC SWITCHING SYSTEM

William K. Roots, Brandon, Manitoba, Canada, assignor to Pioneer Electric Brandon Limited, Manitoba, Canada Application September 24, 1956, Serial No. 611,613

Claims priority, application Canada October 3, 1955

7 Claims. (Cl. 307—34)

This invention relates to an automatic switching system for limiting the total power drawn by a number of loads, and particularly to a system for automatically dropping less preferred loads in order to maintain the total power consumption below a predetermined maximum demand.

In certain areas electrical power is supplied to consumers on a maximum demand basis. The consumers' metering includes a maximum demand meter and the rate structure to the consumer includes a penalty clause whereby the consumers' rate is increased if his power consumption exceeds a certain maximum value. This is to prevent large power consumption peaks which tax the suppliers' facilities. In preventing power consumption from rising above the maximum value it is desirable for the consumer to be able to dump less preferred loads, so that the more preferred loads may continue to draw power.

The present invention provides a system for performing this function automatically when at least three loads are arranged in parallel across a source of supply. Each of the loads except the first has in series with it a switch which is controlled by the power drawn by the preceding load, or in some cases the power drawn by itself in combination with the preceding load or loads, so that whether or not a given load can draw power depends at least to some extent on the power drawn by the previous load or loads. The closing of the switches is controlled so that the maximum level is not normally exceeded; that is, if several loads draw at the same time then the sum of their consumed power is not greater than the allowed maximum demand.

The operation of this system depends on the type of load used. Three basic types of loads will be considered;

(1) A manually switched, on-or-off load which draws power near the allowed maximum demand; for example a motor with a constant load.

(2) A thermostatically controlled on-or-off load which draws power near the maximum demand when on; for example a water heater.

(3) A variable load which may draw from near zero to the allowed maximum demand; for example a range.

If all the loads are of the first type, this system may provide for only one load to be on at any one time, which load is on being governed by the manual switches and the position of the load in the order of preference. If all the loads are of the second type, only one load will normally be on at any one time, but the system forces the loads to be on consecutively so that a given load draws power only during the off-cycle of the preceding load. This is a most satisfactory arrangement and is the most appropriate application of the present system. On the other hand, if the loads are all of the third type, this system provides that more than one load may draw power at the same time provided the total power drawn by those that are on does not exceed the permissible maximum. Of course this system may be used with a group of loads containing all of the previously-mentioned types, thus giving rise to a number of possible combinations of loads, each combination providing a slightly different action.

In drawings which show examples of the invention;

Figure 2 is a more detailed circuit diagram for the system of Figure 1;

Figure 1:
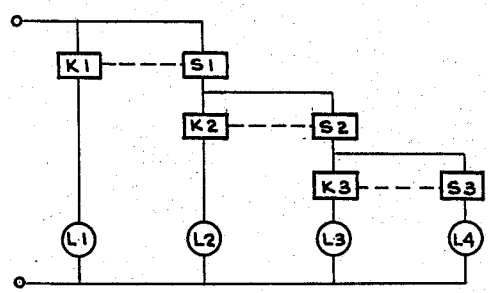
Figure 1 is a block diagram of the preferred form of system according to the present invention and comprising four loads.

In Figure 1 the four loads are indicated at L1, L2, L3 and L4. The manual or thermostatic switches controlling each load individually are not shown. Switching means included in the present system and connected in series with the loads L2, L3 and L4 are indicated by S1, S2 and S3 respectively. It will be noted that in addition to being connected in parallel the third and fourth loads are each supplied through the switch of the previous load. Means sensitive to the power drawn by the parallel loads L1, L2 and L3 are indicated at K1, K2 and K3 respectively, each means being in series with its associated load. This diagram is intended to show the system's operation which is as follows: The power sensitive means K1 closes the switch S1 provided that the power drawn by load L1 is below a certain predetermined level. Means K2 and K3 operate in a similar manner for the switches S2 and S3 respectively.

In the system as illustrated it has been assumed that there is one load, namely load L1, that has absolute priority over all other loads even to the extent of exceeding the maximum demand if necessary, and thus incurring a maximum demand penalty. Such a very important load might well be apparatus in a hospital such as in an operating theatre, or an iron lung. There may, on the other hand, be cases in which no load is sufficiently important to permit the maximum demand being exceeded, in which case a further switch (not shown) can be inserted in the supply to the load L1, such switch being operated by means sensitive to the power being drawn by said load, but set to disconnect this load only when it alone exceeds the maximum permissible load. Such setting would therefore normally be higher than that of the means K1, although both functions may be performed by a single device, such for example as that illustrated in Figures 1 to 3 of United States application No. 502,991.

In order to understand the operation of the circuit of Figure 1 with any given group of loads it will be advantageous to consider first the operation with each of the three previously mentioned types. These types have been defined according to the manner in which each is controlled, and by the amount of power they draw compared with the maximum allowable power demand. These definitions do not cover all the possible types of loads, there being loads for example which are on-off and manually controlled, but which do not draw power equal to the maximum demand. However, with the classification chosen, description of the circuits and their operation is facilitated, and an insight into the operation that the circuit would have with more complicated loads is gained by considering simpler loads first. Accordingly the circuit will be described in conjunction with four examples of different load arrangements.

*Example 1*

Consider all of the loads to be of the previously mentioned first type, that is on-or-off manually controlled and each drawing power near the allowed maximum when switched on. When load L1 is "on" it will draw power substantially equal to the maximum permissible demand, and the loads L2, L3 and L4 will not draw power, since switch S1 is opened by means K1. If load L1 is switched off, switch S1 is closed by means K1 so that any one of loads L2, L3 and L4 may draw power, but only one at a time. That is, if load L2 is switched on then it will draw power substantially equal to the maximum permissible value, thereby causing switch S2 to open, cutting off the power supply to loads L3 and L4. On the other hand, if load L3 is switched on, but load L2 switched off, only load L3 will draw power and switch S3 will be open.

*Example 2*

Consider now the case where all the loads are of the previously mentioned second type, that is on-or-off thermostatically controlled loads each drawing power substantially equal to the allowable maximum demand when on. The load which is drawing power will be determined firstly by the setting of its thermostat and secondly by its position in the system. This latter factor is inherent in the system, since those loads closest to the power supply are preferred, in that, when they are switched on, the subsequent loads are disconnected. The operation would be somewhat as follows: If the thermostat of load L1 is in the "on" condition, L1 will be the only load to draw power. When the thermostat turns load L1 off, then the next load (not necessarily load L2) whose thermostat is in the "on" condition will draw power until either its thermostat turns it off or a preceding load is turned on. By arranging the setting of the thermostats, the less preferred loads L2, L3 and L4 may be caused to operate successively during the off period of load L1.

*Example 3*

In the situation where loads L1, L2, L3 and L4 are all of a variable nature, i. e. the third type referred to, the operation will be as follows: the power sensitive means K1, K2 and K3 will be adjusted to open the switches S1, S2 and S3 when predetermined values of power are reached, but the sum of these predetermined values taken together with the maximum power drawn by the load L4 must not be greater than the maximum permissible power demand. In this way all of the loads can draw current at the same time, provided that each load draws less than the predetermined value to which the current sensitive means that it controls is set. However, when one load exceeds its associated predetermined value, its power sensitive means automatically prevents power from being supplied to the subsequent loads. For example, with each load drawing a power below its predetermined value, if load L2 suddenly exceeds its predetermined value, the power sensitive means K2 will open switch S2 cutting off loads L3 and L4.

In practice, the group of loads controlled by the system may be a combination of all the previously mentioned types. The possible combinations and permutations of the three basic loads are numerous, but the action of the system can be determined from consideration of the previous examples. One of the possible combinations will now be discussed as—

*Example 4*

Load L1 is a variable load; load L2 is an on-or-off manually controlled load, while loads L3 and L4 both are on-or-off thermostatically controlled loads.

In this system it is clear that, at the most, only one of loads L2, L3 or L4 will be on at any given time, and whether or not one is on at all depends on whether the switch S1 is open, which in turn is controlled by the power sensitive means K1. The setting of the power sensitive means K1 must be such that its predetermined value in combination with the power drawn by any one of the loads L2, L3 and L4 is not greater than the allowed maximum demand. The settings of the power sensitive means K2 and K3 need only be less than the power drawn by the loads L2 and L3 respectively. In this system, the two loads L3 and L4 are forced to act consecutively (as in Example 2) in the off cycle of load L2 and only when load L1 draws less than a predetermined value.

In all the examples cited, the power sensitive means K1, K2 and K3, and the switches S1, S2 and S3 have been referred to in general terms so that the action of the system might be described more easily. In practice they may be of any type giving the described action. For example, there may be used a thermally operated electric switching mechanism of a type disclosed in said prior application. This mechanism is of the type used with three wire Edison type single phase power supply systems and comprises two bimetallic strips connected into two wires of the system, and a micro switch operated by a totalizing bar mechanically connecting the two bimetallic strips. The motion of the centre of the totalizing bar is a function of the total current passing through the bimetallic strips, and this centre of the bar is made to trip the microswitch by movement a distance predetermined by the setting of the device. In this particular mechanism, the total current through the two strips that will effect tripping of the microswitch is a function of the unbalance of these two currents, in which case the so-called "predetermined" values of power at which the means K1 etc. will operate the switches S1, etc. will not be wholly fixed predetermined values. On the other hand it is practical to design a totalizing system that will operate in accordance with the total current in a pair of conductors regardless of unbalance between such currents. Either system of operation is applicable to the present invention and thus the term "predetermined value" as used in this specification (including the claims) is intended to mean either a fixed predetermined value, or a predetermined value which, although fixed for any given condition of balance, may vary somewhat as a function of unbalance in the system.

It might be mentioned at this point that the foregoing remarks assume that the system employed is a three-wire Edison type of single phase system. The invention is equally applicable to three-phase systems with or without totalizing, but no detailed illustration or discussion thereof is deemed necessary.

Such a type of totalizing mechanism may be used with a contactor of the type using an energizing coil. The micro switch is then connected in series with this coil so as when closed to energize such core and thus close the main contactor contacts which complete the circuit to the next load. Conversely, the energizing coil of the contactor may be normally energized through a closed micro switch which is opened to de-energize the coil when the predetermined power value is exceeded.

When a micro switch and a contactor are used in this way, the whole combination will correspond to one of the switches referred to in the block diagram of Figure 1 as S1, S2 and S3, while the bimetallic strips and totalizing bar of the mechanism will correspond to the power sensitive means K1, K2 and K3. If the loads concerned were comparatively small, then the contactors could be dispensed with entirely and the micro switches act alone as switches S1, S2 and S3.

Figure 2 is a circuit diagram for the system as described in Figure 1, but with the above mentioned switching mechanism and contactor illustrated. The loads L1, L2, L3 and L4 correspond to the loads of Example 4, numerals 1, 2 and 3 refer to the switching mechanism and numerals 1a, 2a and 3a refer to three contactors as described above. The bimetallic strips are shown at numeral 23, and their connection terminals at numerals 25 and 41. Numeral 6 is a connection panel while numeral 100 refers to the micro switch. The energizing coil 7 of the contactor is in series with the micro switch 100 across the terminals 25 so that the pair of contacts 8 and 9 are closed when the coil 7 is energized. The terminals 25 of the mechanisms 1, 2 and 3 and the contacts 8 and 9 of the contactors 1a, 2a and 3a, are connected in parallel to the live lines of the supply, while the neutral line connects to the center terminal of each panel 6.

It can be seen that the operation of this circuit will be exactly the same as that described for Example 4 given with reference to Figure 1. The predetermined power setting of mechanism 1 must be such that when taken together with the power drawn by any one of the loads L2, L3 or L4, the sum will be less than the maximum permissible value, while the settings of units 2 and 3 must be less than the power drawn by the loads L2 and L3 respectively. When load L1 draws more than the predetermined setting of the unit 1, it will be the only load to operate. When it draws less than the predetermined setting of unit 1, any one of the loads L2, L3 or L4 may operate, with preference being given to load L2. Assuming that the load L2 is turned on, the loads L3 and L4 will not function. When the load L2 is turned off, load L3 will come on, provided that its thermostat is in the "on" condition. During the off-cycle of the load L3, the load L4 may come on and will be governed by its own thermostat, provided that the "on" period of the load L4 is shorter than the "off" period of the load L3. It will be noted that the loads are arranged preferentially, the load L1 being the most preferred load, the load L2 being the next preferred load and so on. In this way the two thermostated loads L3 and L4 are forced to operate alternately when the more preferred loads L1 and L2 are turned off.

In the foregoing examples the system has been described in conjunction with four loads. Any number of further loads may be connected in a like manner. Basically, the invention is concerned with a system in which there are at least three loads, and the invention, in the aspect in which it has been so far described, may be defined as an automatic electric switching system for controlling the electric power supplied to three loads connected in parallel across a source of supply, comprising a first switch arranged in series with the second load, a second switch arranged in series with the third load and the first switch, means controlling said first switch and sensitive to the power drawn by the first load whereby to cause said first switch to be broken only when said power is in excess of a first predetermined value, and means controlling said second switch and sensitive to the power drawn by the second load whereby to cause said second switch to be broken only when said last mentioned power is in excess of a second predetermined value.

Figure 3:
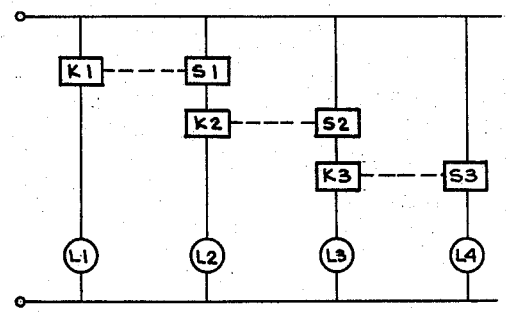
Figure 3 is a block diagram of a modified system.

It is not, however, an essential feature of the present invention that the second switch should necessarily be in series with the first switch as well as with the third load. A system modified in this respect is illustrated in Figure 3. Here it will be observed that the power supply to the load L3 through the switch S2 is taken straight from the incoming source of power without passing through the switch S1. Similarly, the supply to the load L4 may pass only through the switch S3.

Figure 4:
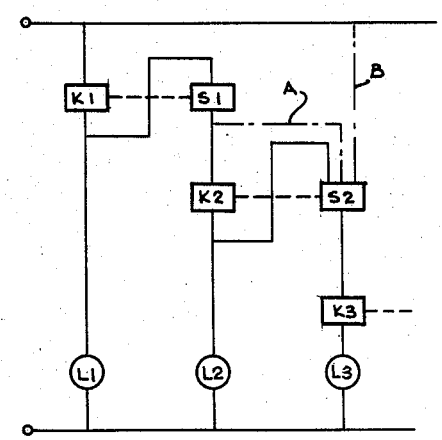
Figure 4 is a block diagram of a second modification.

Another respect in which the invention as defined above may be modified, is that the means controlling the first switch, i. e. the means K1 may be sensitive not only to the power drawn by the first load L1, but instead, to the power drawn by a combination of loads. Figure 4 is provided as an illustration of this further method of connecting the system, and shows three loads L1, L2 and L3 all receiving their power through the means K1 which will thus be sensitive to the power drawn by a combination of all three loads (and any further loads that may be similarly connected). The means K2 controlling the second switch S2 will then be sensitive to its own load L2 and all the loads beyond it (only load L3 in the example illustrated).

It will be clear that a system could be developed that would provide a combination of these various methods of connection, and some illustration of this possibility is furnished in Figure 4 by the broken lines A and B which represent alternative methods of supplying power to the load L3. When the connection A is used instead of the connection to load L3 from the load side of means K2, the relationship between the second and third stages of the circuit will be similar to that shown in Figure 1, while the relationship between the first and second stages remains modified as shown. The power drawn by all the loads will still flow through the means K1 so that the switch S1 will be controlled in accordance with the power drawn by all the loads. The means K2, on the other hand, will be sensitive to the power drawn only by the second load L2.

Finally, when the connection B is used, the means K1 will be sensitive only to the power drawn by loads L1 and L2, and the supply of power to the load L3 will no longer be dependent upon the switch S1, but only upon the switch S2 which is controlled by the sensitive means K2 in accordance with the power being drawn by the load L2 alone.

It would be impossible to set forth all the numerous possible combinations of these different types of connection. It will, however, be clear from these few examples that the means controlling each switch will be sensitive to the power drawn by either the load immediately preceding the load that such switch controls or by some combination of loads which will at least include the load immediately preceding the load that such switch controls. In other words, the means controlling the first switch (in the circuit of the second load) will be sensitive to the power drawn by the first load or a combination of loads including the first load, and so on.

Throughout the foregoing, the phrases "sensitive to the power drawn," etc., and "sensitive to the current drawn," etc., have been used substantially synonymously, on the assumption that the ideal situation of constant voltage exists. In actual practice it will normally be solely the current which controls the so-called "power sensitive means K1, K2 and K3"; voltage fluctuations seldom having any effect. For this reason, and in order to cover the invention generally, since the means K1, etc., will always be "current-sensitive" even when they are accurately "power-sensitive," the claims which follow refer throughout to current values rather than power values.

I claim:

1. An automatic electric switching system for controlling the electric current supplied to at least three loads connected in parallel across a source of supply, comprising a first switch arranged in series with the second load, a second switch arranged in series with the third load, means controlling said first switch and sensitive to the current drawn by a load including at least the first load whereby to cause said first switch to be broken only when said current is in excess of a first predetermined value, and means controlling said second switch and sensitive to the current drawn by a load including at least the second load but excluding the first load whereby to cause said second switch to be broken only when said last mentioned current is in excess of a second predetermined value.

2. An automatic electric switching system as claimed in claim 1, wherein said second switch is arranged in series with the first switch.

3. An automatic electric switching system for controlling the electric current supplied to three loads connected in parallel across a source of supply, comprising a first switch arranged in series with the second load, a second switch arranged in series with the third load, means controlling said first switch and sensitive to the current drawn by a combination of all three loads whereby to cause said first switch to be broken only when said current is in excess of a first predetermined value, and means controlling said second switch and sensitive to the current drawn by the second and third load whereby to cause said second switch to be broken only when said last mentioned current is in excess of a second predetermined value.

4. An automatic electric switching system as claimed in claim 3, wherein said second switch is arranged in series with the first switch.

5. An automatic electric switching system for limiting to a predetermined maximum demand the total consumption of current by three loads connected in parallel across a source of supply, comprising; a first switch arranged in series with the second load; a second switch arranged in series with the third load and the first switch; means controlling said first switch, and sensitive to the current drawn by the first load alone, whereby to cause said first switch to be broken only when said current is in excess of a first predetermined value; and means controlling said second switch, and sensitive to the current drawn by the second load alone whereby to cause said second switch to be broken only when said last mentioned current is in excess of a second predetermined value; wherein the sum of said first predetermined value and said second predetermined value taken together with the maximum current that may be drawn by said third load, is not greater than said predetermined maximum demand.

6. An automatic electric switching system for limiting to a predetermined maximum demand the total consumption of current by three loads connected in parallel across a source of supply, said loads being of such a type that if any two of them were "on" at the same time, the predetermined maximum demand would be exceeded, said system comprising; a first switch arranged in series with the second load; a second switch arranged in series with the third load and the first switch; means controlling said first switch, and sensitive to the current drawn by the first load, whereby to cause said first switch to be broken only when said current is in excess of a first predetermined value; and means controlling said second switch, and sensitive to the current drawn by the second load whereby to cause said second switch to be broken only when said last mentioned current is in excess of a second predetermined value; wherein said first predetermined value is less than the current drawn by said first load and said second predetermined value is less than the current drawn by said second load, and wherein each of said loads is controlled by a manual on-off switch.

7. An automatic electric switching system for limiting to a predetermined maximum demand the total consumption of current by three loads connected in parallel across a source of supply, said loads being of such a type that if any two of them were "on" at the same time, the predetermined maximum demand would be exceeded, said system comprising; a first switch arranged in series with the second load; a second switch arranged in series with the third load and the first switch; means controlling said first switch, and sensitive to the current drawn by the first load, whereby to cause said first switch to be broken only when said current is in excess of a first predetermined value; and means controlling said second switch, and sensitive to the current drawn by the second load whereby to cause said second switch to be broken only when said last mentioned current is in excess of a second predetermined value; wherein said first predetermined value is less than the current drawn by said first load and said second predetermined value is less than the current drawn by said second load, and wherein each of said loads is thermostatically controlled.

References Cited in the file of this patent
UNITED STATES PATENTS

| | | |
|---|---|---|
| 468,686 | O'Brian | Feb. 19, 1892 |
| 1,194,165 | Fry | Aug. 8, 1916 |